(12) United States Patent
Harris et al.

(10) Patent No.: US 12,179,686 B2
(45) Date of Patent: Dec. 31, 2024

(54) AIRBAG CHUTE AND SUBSTRATE ASSEMBLY AND METHOD OF MANUFACTURING THE SAME

(71) Applicant: INOAC USA, Inc., Troy, MI (US)

(72) Inventors: Bradley W. Harris, South Lyon, MI (US); Michael J. Aittama, Fenton, MI (US)

(73) Assignee: INOAC USA, Inc., Troy, MI (US)

( * ) Notice: Subject to any disclaimer, the term of this patent is extended or adjusted under 35 U.S.C. 154(b) by 0 days.

(21) Appl. No.: 18/351,990

(22) Filed: Jul. 13, 2023

(65) Prior Publication Data
US 2024/0025369 A1 Jan. 25, 2024

Related U.S. Application Data

(60) Provisional application No. 63/391,372, filed on Jul. 22, 2022.

(51) Int. Cl.
*B60R 21/215* (2011.01)
*B60R 21/205* (2011.01)

(52) U.S. Cl.
CPC .......... *B60R 21/215* (2013.01); *B60R 21/205* (2013.01); *B60R 2021/21537* (2013.01)

(58) Field of Classification Search
CPC ............... B60R 21/215; B60R 21/205; B60R 2021/21537; B60R 21/2165
See application file for complete search history.

(56) References Cited

U.S. PATENT DOCUMENTS

| | | | |
|---|---|---|---|
| 5,868,419 A | 2/1999 | Taguchi et al. | |
| 6,601,870 B2 | 8/2003 | Suzuki et al. | |
| 6,623,029 B2* | 9/2003 | Sun ..................... | B60R 21/2165 280/732 |
| 8,336,908 B1 | 12/2012 | Kalisz et al. | |
| 8,469,393 B1 | 6/2013 | Siewert et al. | |
| 8,474,861 B1 | 7/2013 | Twork | |
| 9,771,044 B1* | 9/2017 | Patnala ............... | B60R 21/2165 |
| 9,975,517 B2 | 5/2018 | Shick et al. | |
| 10,093,267 B2 | 10/2018 | Kong | |
| 11,332,095 B2 | 5/2022 | Harris et al. | |
| 2008/0136146 A1 | 6/2008 | Kong | |
| 2017/0066401 A1 | 3/2017 | Cowelchuk et al. | |
| 2018/0272983 A1* | 9/2018 | Mazzocchi ........... | B60R 21/205 |

FOREIGN PATENT DOCUMENTS

| | | | |
|---|---|---|---|
| JP | 2010069854 A | 4/2010 | |
| KR | 100828817 B1 | 5/2008 | |

* cited by examiner

*Primary Examiner* — Paul N Dickson
*Assistant Examiner* — Matthew Joseph Ganci
(74) *Attorney, Agent, or Firm* — Reising Ethington P.C.

(57) ABSTRACT

A method of manufacturing a chute panel of an airbag assembly. The method comprises forming a substrate from a material with the substrate comprising a plurality of projections projecting from a first surface of the substrate. A living hinge including a plurality of apertures is secured to the substrate with at least portion of the apertures mating with a portion of the projections of the substrate to secure the hinge to the substrate. A chute door is formed onto the substrate and onto the hinge secured to the substrate. A chute is formed onto the substrate with a portion of the chute interacting with a portion of the plurality of projections of the substrate, thereby forming a chute panel of an airbag assembly.

20 Claims, 12 Drawing Sheets

AIRBAG CHUTE AND SUBSTRATE ASSEMBLY AND METHOD OF MANUFACTURING THE SAME

CROSS-REFERENCE TO RELATED APPLICATIONS

This application claims the benefit of U.S. Provisional Application Ser. No. 63/391,372 filed on Jul. 22, 2022 the entire content of which is incorporated herein by reference in its entirety.

STATEMENT REGARDING FEDERALLY SPONSORED RESEARCH

NONE.

STATEMENT REGARDING JOINT DEVELOPMENT AGREEMENT

NONE.

REFERENCE TO SEQUENCE LISTING, TABLE OR COMPUTER PROGRAM LISTING

NONE.

FIELD OF THE DISCLOSURE

The present disclosure relates generally to vehicular airbag assemblies, and more particularly, to an airbag chute and substrate assembly of a passenger airbag assembly and a method of manufacturing the same.

BACKGROUND OF THE DISCLOSURE

Passenger airbag assemblies are typically provided in the dashboard of a vehicle and are positioned in front of the passenger seat. Such an airbag assembly generally includes a chute panel that forms part of an instrument panel of the vehicle, and an airbag cannister that houses an airbag in a deflated or folded state. The chute panel may include as components a substrate, a chute, and a chute door, and when the airbag assembly is assembled, the airbag cannister is disposed within and secured to the chute. When the airbag is activated, the airbag inflates within the chute causing the chute door to rupture allowing the airbag to be blown out from the chute and the dashboard and into the cabin of the vehicle toward the passenger seat.

As described above, a chute panel of a passenger airbag assembly generally includes at least a substrate and a chute that is configured to house an airbag cannister. A conventional way of manufacturing such a chute panel includes forming the substrate and the chute as two separate parts or components and then coupling them together using, for example, a welding process such as vibration welding, hot plate welding, or laser welding. This manufacturing process is not without its drawbacks, however.

For example, since the chute panel is constructed of two separate parts that have to be welded together, the chute panel is relatively heavy. Additionally, the required welding process results in a rather long manufacturing time, causes portions of the two components to melt, and requires the use of expensive equipment to perform the welding process.

Accordingly, there is a need for a passenger seat airbag assembly chute panel and a method of manufacturing the same that minimizes and/or eliminates one or more of the above-identified deficiencies in conventional chute panels and chute panel manufacturing processes.

SUMMARY OF THE DISCLOSURE

In at least some embodiments, a method of manufacturing a chute panel of an airbag assembly comprises the steps of providing a substrate having a first surface and a plurality of projections located on the first surface; providing a hinge, the hinge including a plurality of apertures, with some of the apertures mating with some of the plurality of projections on the first surface to thereby secure the hinge to the first surface; forming a chute door onto said first surface and onto a portion of said hinge secured to the first surface; and forming a chute onto the first surface, the chute surrounding the chute door.

In at least some embodiments, a chute panel of an airbag assembly comprises a substrate having a first surface and a plurality of projections on the first surface, the plurality of projections comprising a set of first projections and a set of second projections; a hinge comprising a first leaf joined to a second leaf by a flexible wing, the first leaf and the second leaf each having a plurality of apertures in them, wherein the plurality of apertures in the first leaf are mated to the set of first projections and at least some of the plurality of apertures in the second leaf are mated to the set of second projections to thereby secure the hinge to the first surface; a chute door molded onto the first surface and a portion of the hinge; and a chute molded onto the first surface and surrounding the chute door.

BRIEF DESCRIPTION OF THE DRAWINGS

One or more aspects of the disclosure will hereinafter be described in conjunction with the appended drawings, wherein like designations denote like elements, wherein dotted lines in the drawings form no part of the disclosed structure and wherein:

FIG. 8A is a U type one door design, FIG. 8B is an H type two door design, FIG. 8C is a Y type three door design, and FIG. 8D is a Bow Tie type four door design;

DETAILED DESCRIPTION OF THE DISCLOSURE

Figure 1:
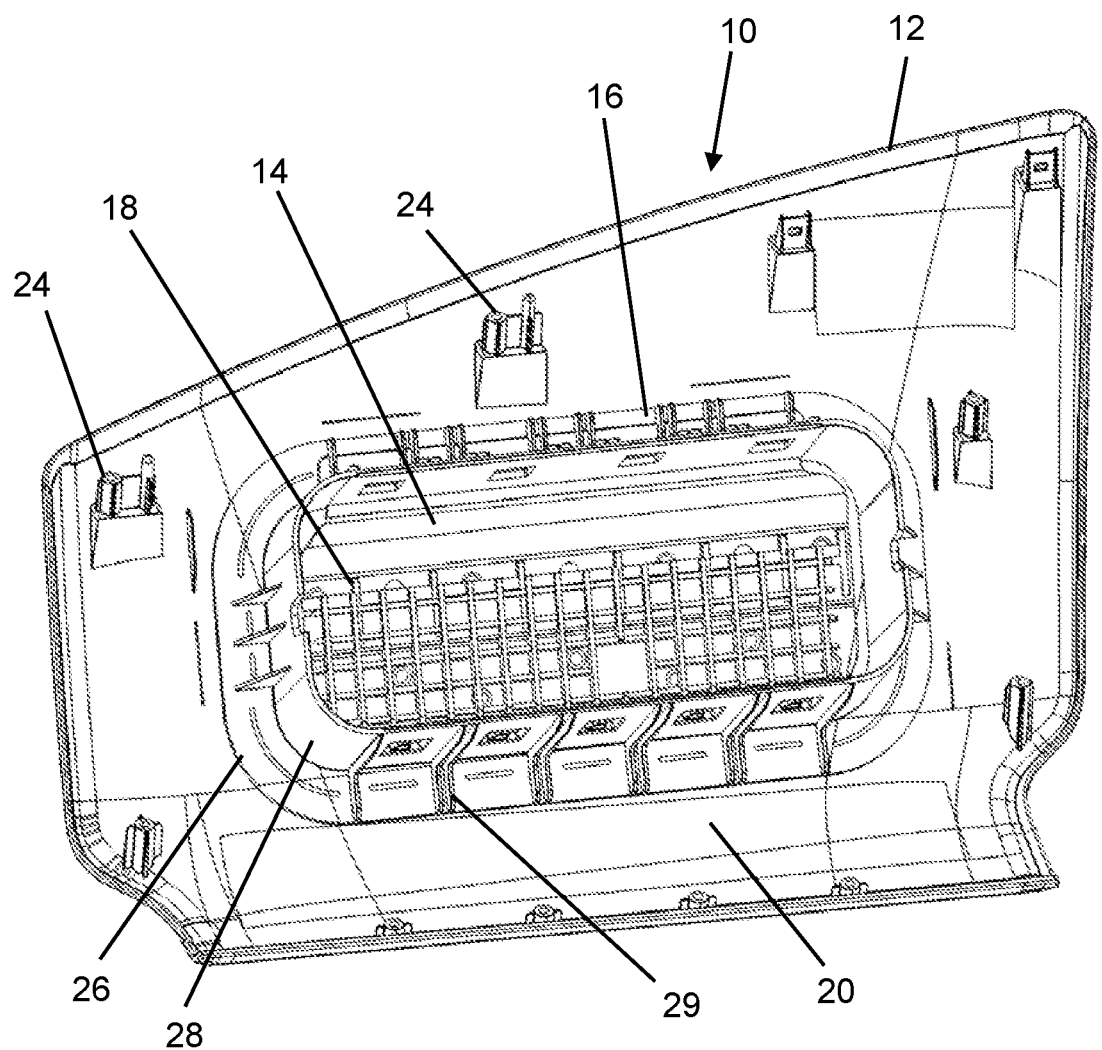
FIG. 1 is a bottom view of an illustrative embodiment of an assembled chute panel without an airbag cannister.
Figure 2:
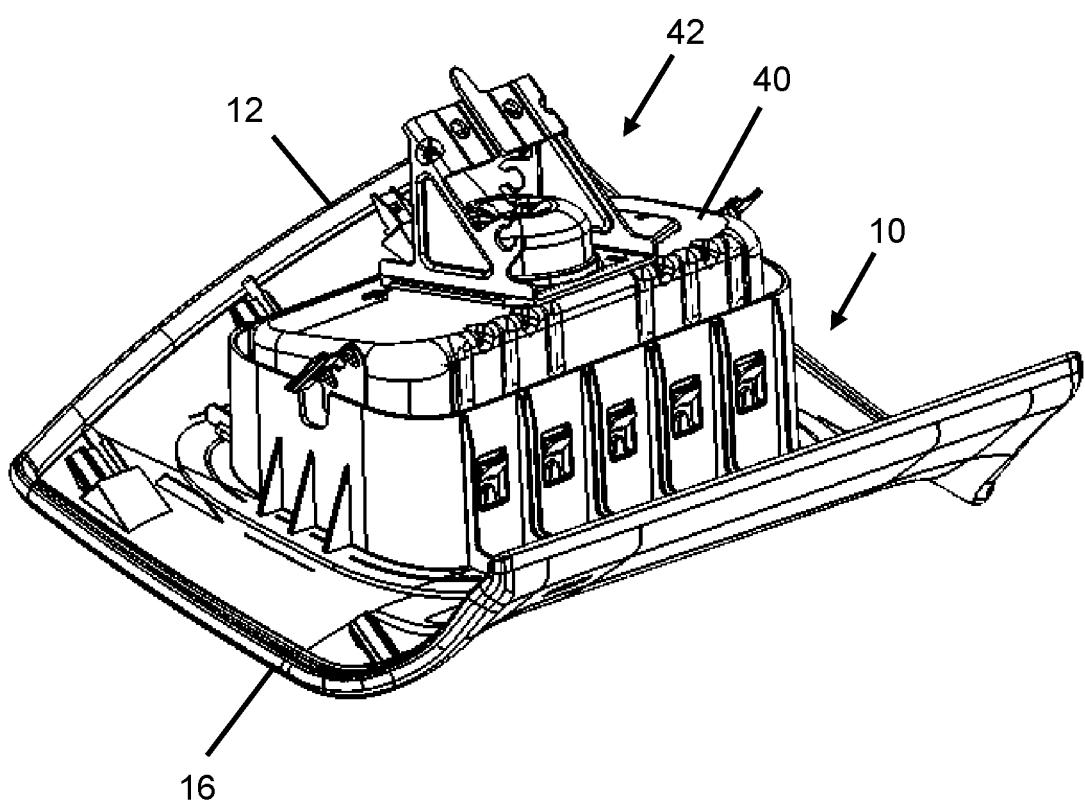
FIG. 2 is a perspective view of an illustrative embodiment of the assembled chute panel of FIG. 1 with an airbag cannister therein.
Figure 8A:
FIG. 8A to 8D illustrate schematic diagrams of four alternative embodiments of chute door burst seam designs that can be used in the present disclosure.
Figure 8B:
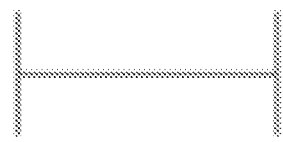
Figure 8C:
Figure 8D:
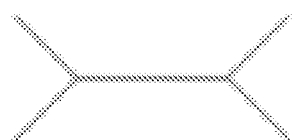
Figure 9:
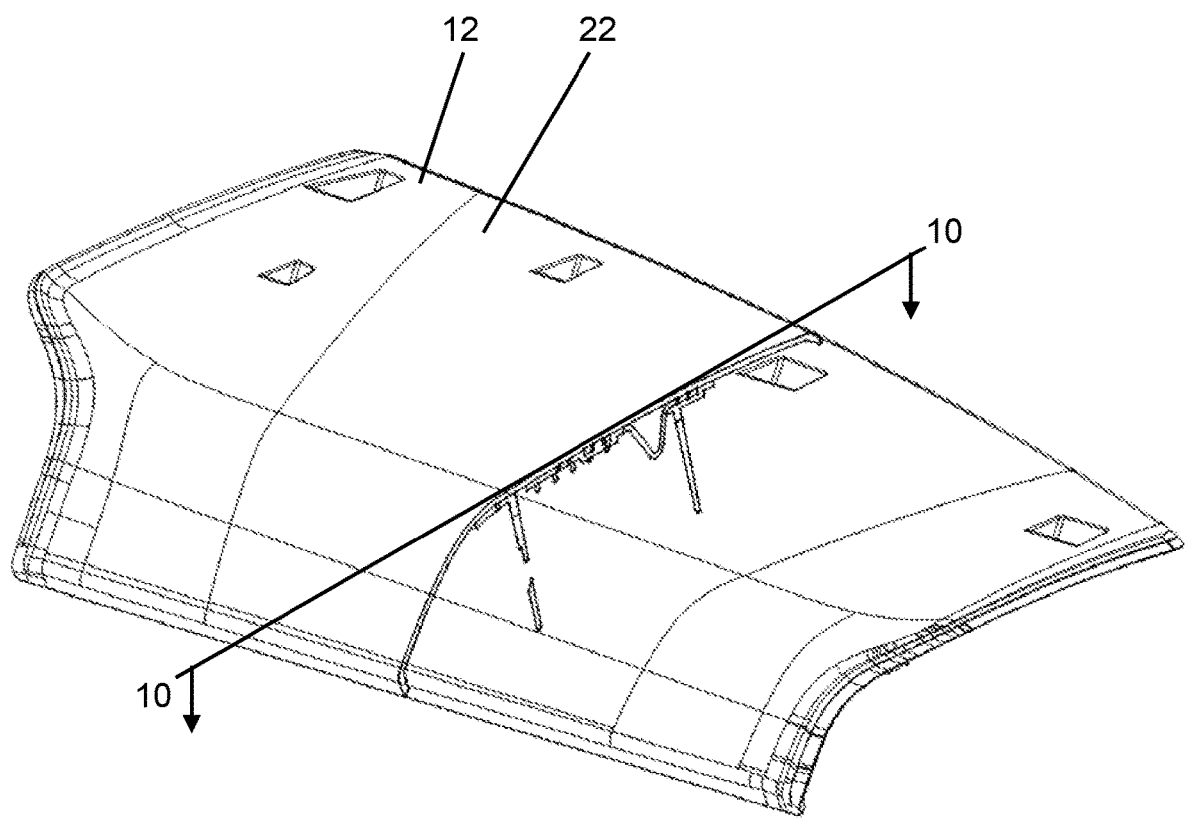
FIG. 9 is a top perspective view of the chute panel illustrated in FIG. 1.

Referring in more detail to the drawings, FIG. 1 depicts a bottom view of an illustrative embodiment of an assembled chute panel 10 according to an embodiment of the present disclosure. The chute panel 10 includes at least a substrate 12, a hinge 14, a chute 16 and a chute door 18. The chute door 18 is shown as a U-shaped single door although many other shapes and numbers of doors can be utilized as discussed herein and as shown in FIG. 8A to 8D. The substrate includes a first surface 20, which is shown in FIG. 1 and an opposite second surface 22 as shown in FIG. 9. The hinge 14, chute 16 and chute door 18 are all located on the first surface 20. The first surface 20 also includes a plurality of clips 24 to secure the chute panel 10 into an instrument panel in a vehicle. The substrate 12 has a curvilinear shape in the illustrated embodiment as seen best in FIG. 9; however, as known to one of skill in the art the shape of the substrate 12, especially of the second surface 22, will be dictated by its location in the instrument panel. The chute 16 includes a base 26 and one or more sidewall(s) 28 extending up from the base 26. The sidewall(s) 28 can include plurality of sidewall supports 29 that add rigidity and support to the sidewall(s) 28. As shown in FIG. 2, an airbag cannister 40 of a vehicle airbag assembly 42 is received inside the chute 16 and is surrounded by the sidewall(s) 28. The chute 16 is sized to accommodate the airbag cannister 40.

Figure 3:
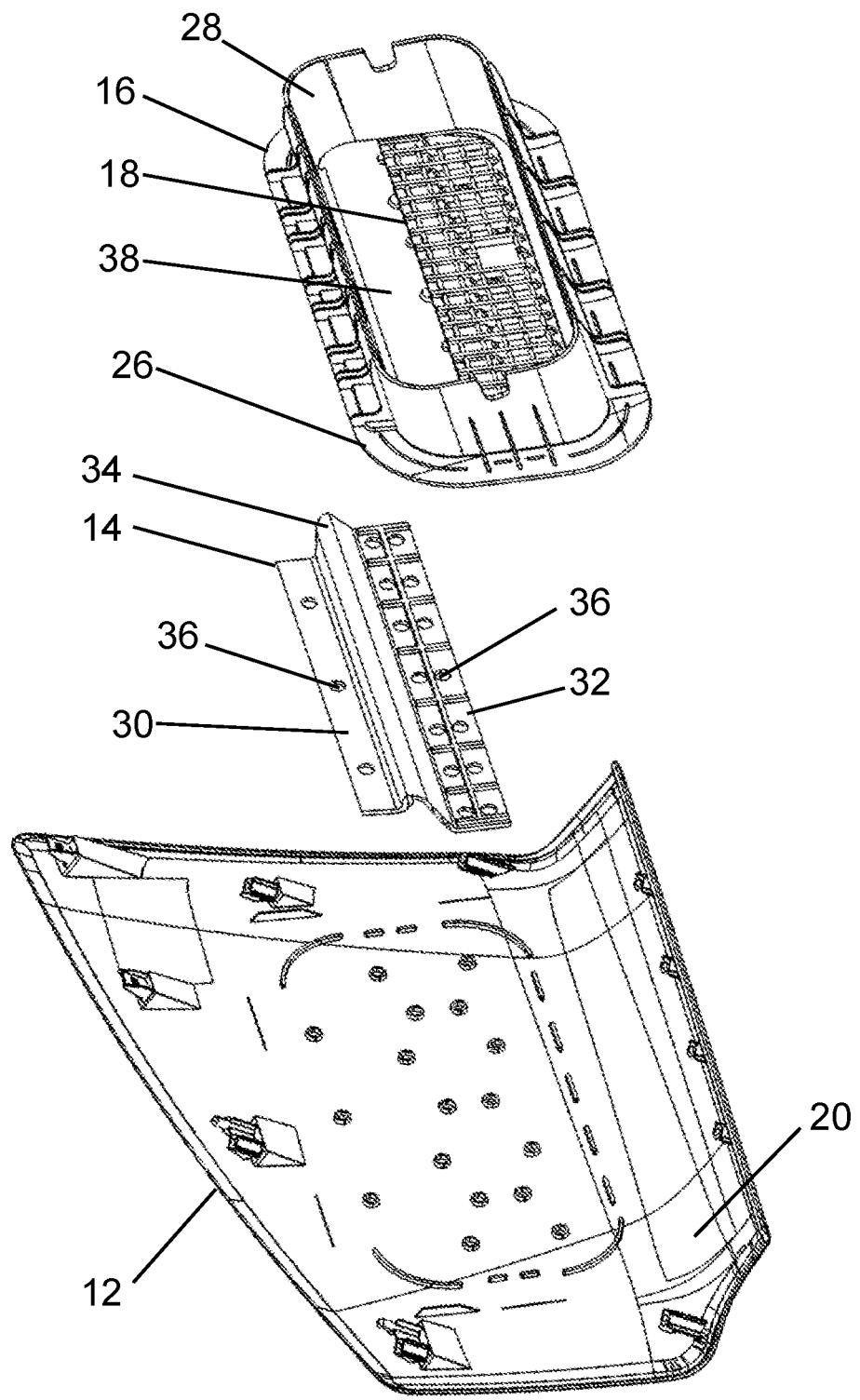
FIG. 3 is an exploded view of an illustrative embodiment of four main portions of the illustrative embodiment of a chute panel including a substrate, a hinge and a chute with an illustrative embodiment of a chute door.

FIG. 3 is an exploded view of an illustrative embodiment of the four main components of the chute panel 10. Namely, the substrate 12, hinge 14, chute 16 and chute door 18. The hinge 14 is a living hinge 14 that does not include any knuckles or a pin. Instead, it has a first leaf 30 and a second leaf 32 joined by a flexible wing 34. It is a single unitary piece and each leaf 30, 32 includes a plurality of apertures 36. When the chute panel 10 is assembled the wing 34 can be accommodated in a gap 38 between the chute door 18 and the inside of the sidewall 28 of the chute 16 as shown in FIG. 1.

Figure 4:
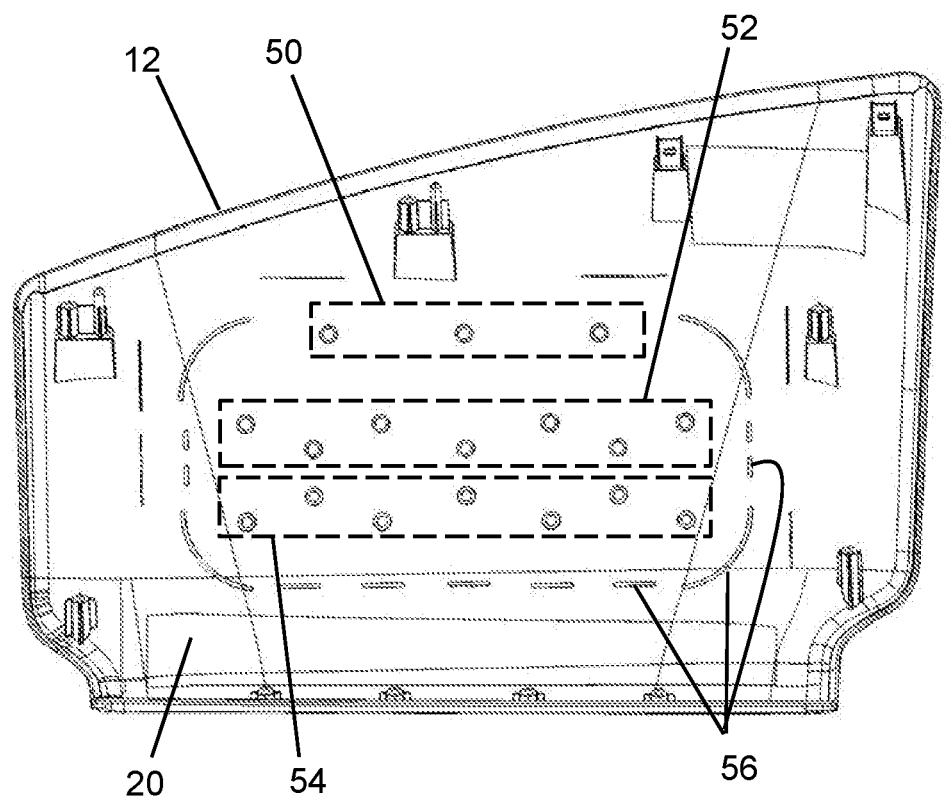
FIG. 4 is an enlarged bottom view of the substrate illustrated in FIG. 3.
Figure 5:
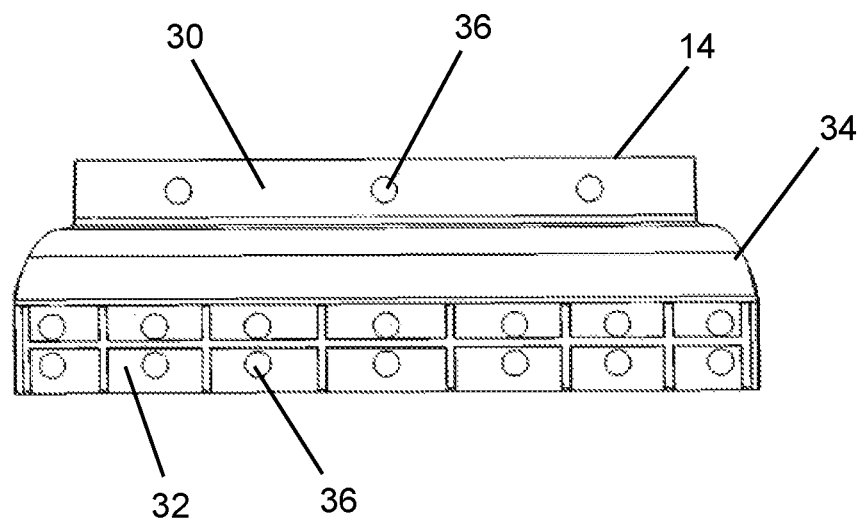
FIG. 5 is an enlarged top view of the hinge illustrated in FIG. 3.

FIG. 4 is an enlarged bottom view of the substrate 12 and FIG. 5 is a top view of the hinge 14. The first surface 20 includes a plurality of projections that are raised above the first surface 20. These include a plurality of first projections 50 shown surrounded by a dotted line box to indicate which are the first projections 50. A plurality of second projections 52 are surrounded by a second dotted line box to indicate which are the second projections 52. A plurality of third projections 54 are surrounded by a third dotted line box to indicate which are the third projections 54. Finally, a plurality of fourth projections 56 are found arranged on the first surface 20 around the first, second and third projections 50, 52, 54. The first projections 50 are shaped, spaced and arranged to mate with the plurality of apertures 36 on the first leaf 30 of the hinge 14. The shape, number and arrangement of the first projections 50 matches the shape, number and arrangement of the apertures 36 in the first leaf 30. In the illustrative embodiment the first projections 50 and the apertures 36 on the first leaf 30 are shown as being circular, however any mating shapes could be used. This allows the first leaf 30 of the hinge 14 to be secured to the substrate 12, preferably in a snap-fit or friction fit manner. The second projections 52 are shaped, spaced and arranged to mate with a portion of the plurality of apertures 36 on the second leaf 32 of the hinge 14. In the illustrative embodiment shown, the second projections 52 have a circular shape and are arranged in a staggered array; however other shapes and arrangements could be used so long as the second projections 52 can mate with a portion of the apertures 36 in the second leaf 32 of the hinge 14. This mating between the second projections 52 and a portion of the apertures 36 on the second leaf 32 allows the second leaf 32 of the hinge 14 to be secured to the substrate 12, preferably in a snap-fit or friction fit manner. Thus, when assembling the chute panel 10 the substrate 12 and the hinge 14 are initially formed separately, as will be described herein, and then fitted together in a snap-fit or friction-fit manner to secure the hinge 14 to the first surface 20 of the substrate 12. The apertures 36 on the second leaf 32 that do not mate with the second projections 52 are flush against the first surface 20 and in this location, they form wells that are used during the process of securing the chute door 18 to the substrate 12 and the hinge 14, as will be described herein. In a similar fashion the third projections 54 are used during the process of securing the chute door 18 to the substrate 12, as will be described herein. The first surface 20 also includes a series of fourth projections 56 having a variety of shapes arranged around the first, second and third projections 50, 52, 54. These fourth projections 56 are used during formation of the chute 16 onto the substrate 12 to secure the chute 16 onto the substrate 12, as will be described herein. Specifically, the fourth projections 56 interact with the base 26 of the chute 16.

Figure 6:
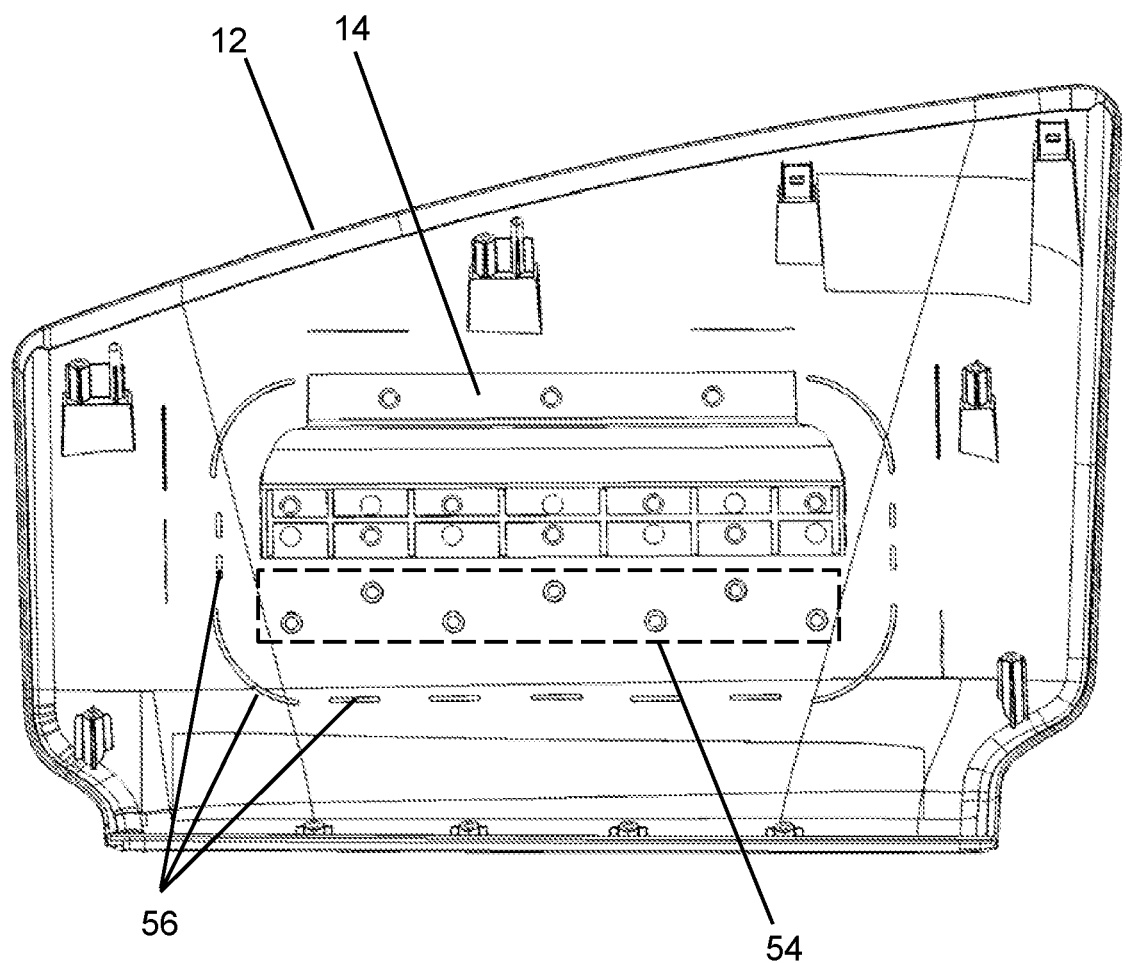
FIG. 6 is a view of the hinge illustrated in FIG. 5 secured to the substrate illustrated in FIG. 4.

As will be described herein, the substrate 12 and the hinge 14 are formed separately. Then the hinge 14 is snap-fitted or friction-fitted onto the first and second projections 50, 52 of the substrate 12 as shown in FIG. 6. As can be seen in the FIG. 6, the first and second projections 50, 52 of the substrate 12 are received into a plurality of apertures 36 of the hinge 14. The third and fourth projections 54, 56 remain exposed as shown in FIG. 6.

Figure 7:
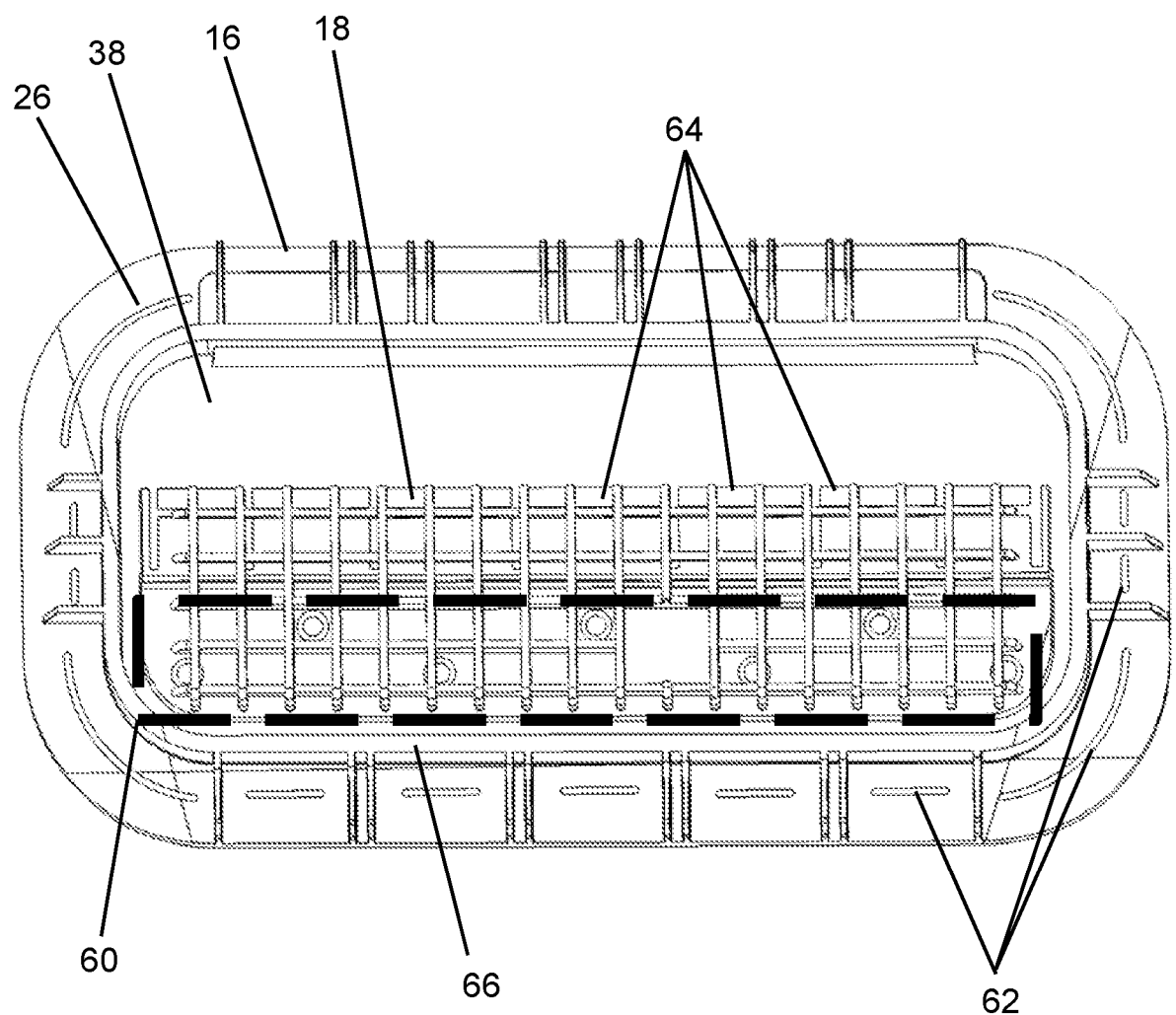
FIG. 7 is a top view of the chute and chute door illustrated in FIG. 3.

FIG. 7 is a top view of the chute 16 and chute door 18 illustrated in FIG. 3. The chute 16 and chute door 18 are formed over the substrate 12 after the hinge 14 has been attached to the substrate 12 as shown in FIG. 6, as will be further described herein. In FIG. 7 a dotted-line box 60 is shown around the location where the third projections 54 will interact with and interlock with the chute door 18 when it is formed. Additionally, one sees at 62 where the fourth projections 56 will interact with and interlock with the base 26 of the chute 16 when the chute 16 is formed onto the substrate 12. The chute door 18 includes along one edge a series of tabs 64. The back side, opposite the side shown, of these tabs 64 when formed include projections, not shown in this Figure, that fill in the open apertures 36 of the hinge 14 described above as wells to secure the chute door 18 to the hinge 14 when the chute door 18 is formed. A burst seam 66 is formed by at least one gap between the chute door 18 and the chute 16. As shown in this example it is a U type one door burst seam 66.

FIG. 8A to FIG. 8D show a series of known chute door 18 burst seam 66 designs that find use in the present disclosure. These include the single door U type design as shown in FIGS. 1, 3 and 7; an H type two chute door design; a Y type three chute door design and a Bow Tie type four chute door design. These burst seam 66 designs are known in the art. In each design a hinge 14 would be secured to the substrate 12 first surface 20 and to each of the chute doors 18. Thus, in alternative embodiments there could be two, three or four hinges 14 to secure the number of chute doors 18. Other designs are also possible, and the present disclosure does not require a specific burst seam 66 shape or design.

Figure 10:
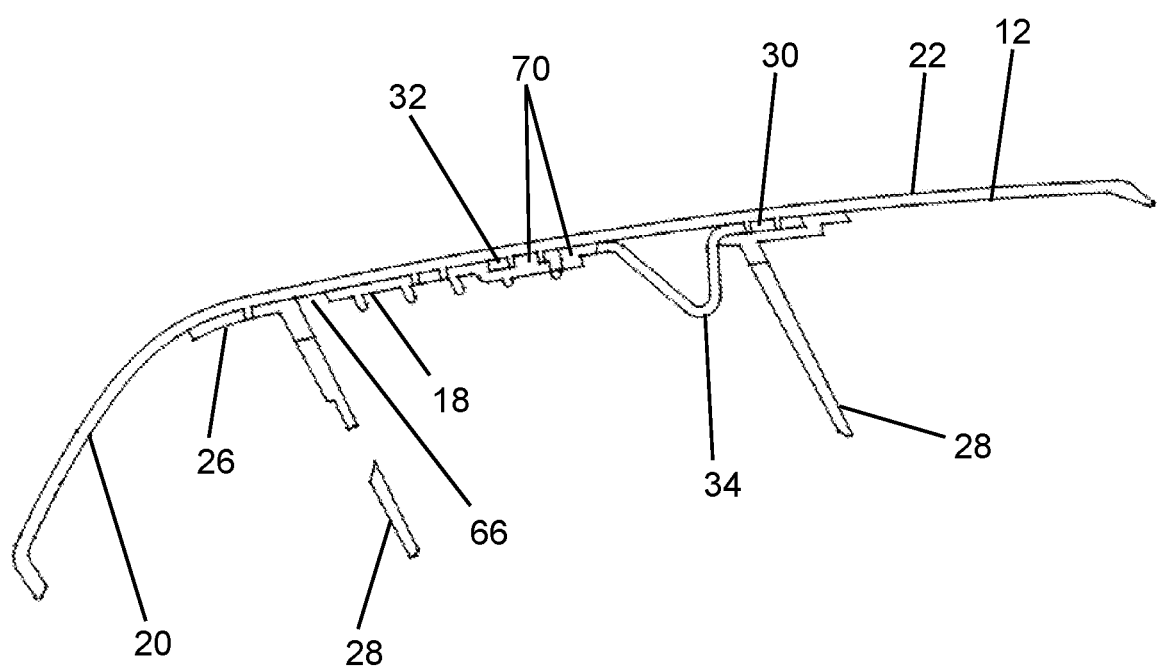
FIG. 10 is a side view of the cross-section view of the chute panel illustrated in FIG. 9 taken along the line 10-10 in FIG. 9.
Figure 11:
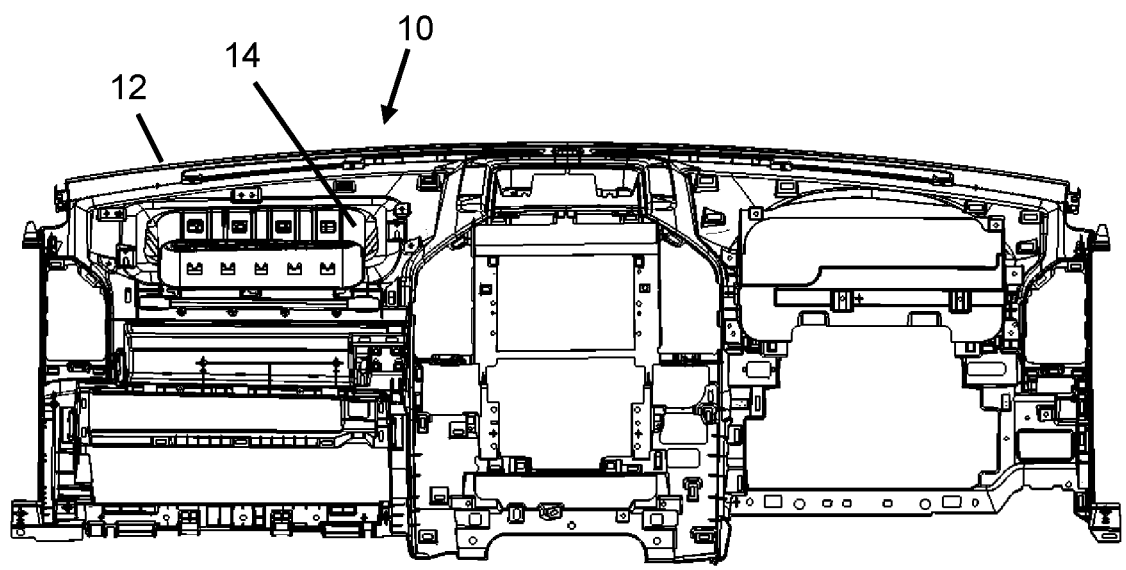
FIG. 11 is a perspective view of an illustrative embodiment of a chute panel of an airbag assembly that comprises a full vehicle instrument panel substrate.

FIG. 9 shows a top perspective view of the chute panel 10 illustrated in FIG. 1 and line 10-10 is a cross-section through the chute panel as shown in FIG. 10. As can be seen at 70 in FIG. 10, when the chute 16 and chute door 18 are formed onto the substrate 12 and hinge 14 in the molding process this forms projections 70 that are found in the apertures 36 that are not mated with the second projections 52. FIG. 11 shows a perspective view of an illustrative embodiment of a chute panel 10 of a vehicle airbag assembly 42 that comprises a full instrument panel substrate 12.

Figure 12:
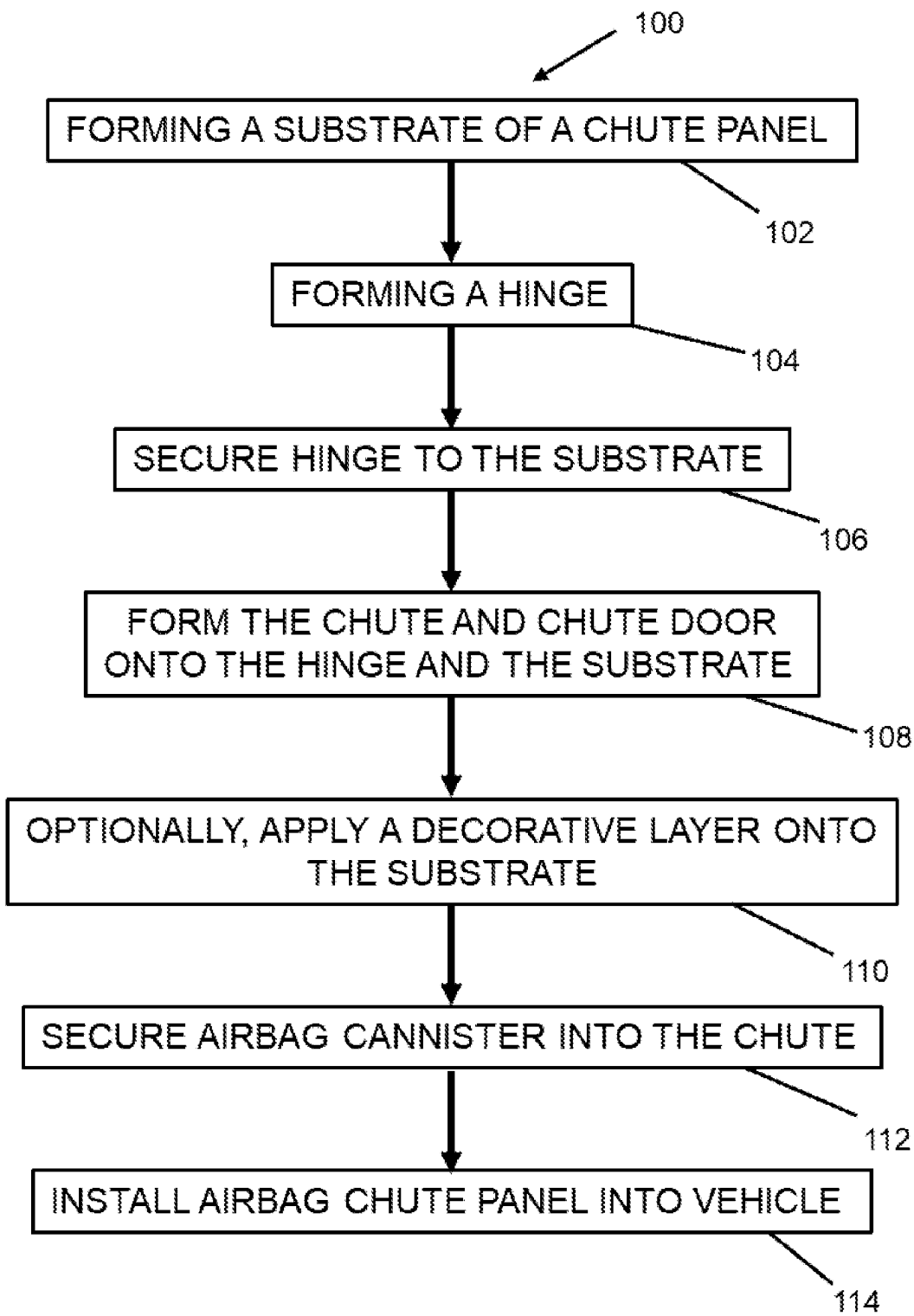
FIG. 12 is a flowchart of an illustrative embodiment of a method of manufacturing a chute panel of an airbag assembly according to the present disclosure.

FIG. 12 depicts an illustrative embodiment of a method 100 of manufacturing a passenger airbag chute panel 10 of a vehicular airbag assembly 42 according to the present disclosure. For purposes of illustration and clarity only, the method 100 will be primarily described in the context of the chute panel 10 embodiments as illustrated herein and as shown in the Figures of the present specification. It will be appreciated, however, that the application of the present methodology is not meant to be limited solely to such embodiments of the chute panel 10. Rather method 100 may find application in any number of chute panel embodiments or designs that differ in one or more respects from the chute panel embodiments described herein. Additionally, it will be appreciated that unless otherwise noted, performance of the method 100 is not meant to be limited to any one particular order or sequence of steps.

In at least some embodiments, method 100 includes a step 102 of forming the substrate 12 of the chute panel 10. In an embodiment wherein method 100 includes such a step, step 102 may comprise forming the substrate 12 using a known molding process, for example, an injection molding process. More specifically, step 102 may comprise introducing an appropriate amount of molding material into a suitable mold and holding the material therein for a predetermined amount of time. The molding material is then cooled and the resulting substrate 12 is removed from the mold. A number of different types of molding material may be used in step 102 to form the substrate 12, including for example and without limitation, a thermoplastic polyolefin (TPO) material or a material comprised of a TPO and talc or glass as a filler. As described the TPO material can include a filler, for example talc, glass or other known fillers, the use of filler is to impart rigidity to the substrate 12 as is known to one of skill in the art. It will be appreciated, however, that while particular examples of molding materials have been provided, any number of suitable materials may be used, and thus, the present disclosure is not intended to be limited to any particular material(s).

The particular form or design of the substrate 12 formed in step 102 will depend, at least in part, on the particular mold used in its formation. In the embodiment illustrated in, for example, FIG. 4, the forming step 102 comprises forming the substrate 12 to have a first surface opposite a second surface 22 (best shown in FIG. 9). The substrate 12 includes a plurality of first projections 50 that are raised above the first surface 20. Here the first projections 50 are shown as being circular, however, other shapes could be utilized. The first projections 50 are arranged in a pattern to facilitate securing the first leaf 30 of the hinge 14 to the first surface 20 of the substrate 12 as explained herein. The substrate 12 further includes a plurality of second projections 52 also raised above the first surface 20 and these have a variety of shapes and are utilized to aid in securing the second leaf 32 of the hinge 14 to the first surface 20 of the substrate 12. The substrate 12 includes a plurality of third projections 54 raised above the first surface 20 and that are shown as being circular, however, they can be any shape. The third projections 54 are utilized to aid in securing the chute door 18 to the first surface 20. Finally, the first surface 20 includes a plurality of fourth projections 56 that are used to secure the chute 16 to the substrate 12 as explained herein. As discussed, the projections 50, 52, 54, 56 can have any desired shape and can be in any number of configurations, the present disclosure is not limited to any particular number or arrangement of projections 50, 52, 54, 56. For example, if the chute door 18 is a two door, three door or four door design as shown in FIGS. 8B, 8C and 8D, respectively, then the arrangement of projections 50, 52, 54, and 56 may be changed to accommodate more than one hinge 14 and to account for the proper placement of the hinge(s) 14 and chute door(s) 18. The clips 24 on the first surface 20 are also formed during the molding process. During the molding process the mold can include, if desired, a decorative design on the second surface 22 of the substrate 12. Once the substrate 12 has cooled sufficiently it is removed from the mold.

In any event, a second step in the method 100 comprises the step of forming the one or more hinges 14 in step 104 of the method 100. Like the substrate 12 in step 102, the hinge the hinge is preferably formed in a molding process, preferably an injection molding process and preferably from a TPO material. As known to one of skill in the art the hinge 14 could be formed from materials other than TPO. More specifically, step 104 may comprise introducing an appropriate amount of molding material into a suitable mold and holding the material therein for a predetermined amount of time. The molding material is then cooled and the resulting one or more hinge(s) 14 are removed from the mold.

In a third step 106 of the method 100, the one or more hinges 14 are secured to the substrate 12 via the first and second projections 50, 52 which fit into a plurality of apertures 36 in the first and second leaves 30, 32 of each hinge 14. This is best shown in FIG. 6 where a single hinge 14 is secured to the substrate 12. In the illustrative embodiment all of the apertures 36 in the first leaf 30 are friction or snap-fit onto the first projections 50 of the substrate 12. Then a plurality of the apertures 36 in the second leaf 32 are friction or snap-fit onto the second projections 52 thereby securing the hinge 14 to the first surface 20 of the substrate 12. As shown in FIG. 6, a plurality of the apertures 36 on the second leaf 32 are not fit onto any projections on the substrate 12 but they are flush against the first surface 20 and thus form a type of a well that helps to secure the chute door 18 to the hinge 14 and the substrate 12 as explained herein.

In a fourth step 108 of the method 100 the chute 16 and chute door 18 are formed onto the substrate 12 and the at least one hinge 14. Step 108 may comprise forming the chute 16 and chute door 18 using a known molding process, for example, an injection molding process. More specifically, step 108 may comprise placing the substrate 12 with secured one or more hinges 14 into a mold and then introducing an appropriate amount of molding material into a suitable mold and holding the material therein for a predetermined amount of time to thereby form the chute 16 and chute door 18 onto the substrate 12 and one or more hinges 14. The molding material is then cooled and the resulting chute panel 10 is removed from the mold. A number of different types of molding material may be used in step 108 to form the chute 16 and chute door 18, including for example and without limitation, a thermoplastic polyolefin (TPO) material. It will be appreciated, however, that while particular examples of molding materials have been provided, any number of suitable materials may be used, and thus, the present disclosure is not intended to be limited to any particular material(s). In a most preferred embodiment the substrate 12, hinge(s) 14, chute 16 and chute door(S) 18 are all formed from a TPO molding material. This will ensure that the components are all well bonded to each other and that they don't suffer from material incompatibility issues that can arise when different materials are used to form each component. In the molding process the mold will cause the chute door 18 to include material that fills the wells created by the open apertures 36 of the hinge 14 and thus interlock the chute door 18 to the hinge 14 and the substrate 12. Likewise, the chute door 18 will mold around the third projections 54 of the substrate 12 to interlock the chute door 18 to the substrate 12. The chute base 26 will be molded over the fourth projections 56 as the chute 16 is molded and these projections 56 will help to interlock the chute 16 to the substrate 12. Since the chute 16 and chute door(s) 18 are separate parts the injection mold will require at least two gates, one for each to properly fill the mold even if the molding is carried out in a single step. In summary, the projections 50, 52, 54, and 56 along with the wells formed by open apertures 36 form a series of interlocks among the substrate 12, hinge(s) 14, chute 16, and chute door(s) 18 to form a structurally sound chute panel 10. When the airbag cannister 40 deploys the hinge(s) 14 secures the chute door(s) 18 to the substrate 12 and the burst seam(s) 66 between the chute door(s) 18 and the chute 16 allows the substrate 12 to break at this point and release the airbag into the vehicle compartment.

In another step 110 of the method 100, optionally, a decorative layer may be applied to the second surface 22 of the chute panel 10, which will face into the vehicle interior when in an instrument panel as shown in FIG. 11. These decorative layers may take many forms, for example, a cover stock can be vacuum formed over the second surface 22 of the substrate 12. Alternatively, the cover stock can be a cut and sewn hand warped cover over the second surface 22. In other instances, the cover stock could be a hard cover include a molded in color or a painted surface. Since the chute 16 forms no visible features on the second surface 22 of the substrate 12 it provides for many decorative features to be included on the second surface 22 if desired. The decorative layer can comprise leather, faux leather, cloth or other materials.

In steps 112 and 114 of the method 100 the airbag cannister is secured in the chute 16 as shown in FIG. 2 and then the chute panel 10 is installed in a vehicle.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The invention claimed is:

1. A method of manufacturing a chute panel of an airbag assembly comprising:
 a.) providing a substrate having a first surface and a plurality of projections located on said first surface;
 b.) providing a hinge, said hinge including a plurality of apertures, some of said apertures mating with some of said plurality of projections on said first surface to thereby secure said hinge to said first surface;
 c.) forming a chute door onto said first surface and onto a portion of said hinge that is secured to said first surface; and
 d.) forming a chute onto said first surface, said chute surrounding said chute door.

2. The method according to claim 1, wherein said plurality of projections includes a set of first projections and a set of second projections, said hinge comprising a first leaf having a portion of said plurality of apertures and a second leaf comprising another portion of said plurality of apertures, and wherein said set of first projections are mated into said apertures on said first leaf and said set of second projections are mated into some of said apertures on said second leaf to thereby secure said hinge to said first surface.

3. The method according to claim 2, wherein step b) comprises either friction fitting or snap-fitting said set of first projections and said set of second projections into mating apertures on said first leaf and said second leaf of said hinge, respectively, to thereby secure said hinge to said first surface.

4. The method according to claim 1, wherein step c.) comprises molding said chute door onto said first surface and said portion of said hinge.

5. The method according to claim 4, wherein step c.) comprises injection molding said chute door onto said first surface and said portion of said hinge.

6. The method according to claim 4, wherein said chute door is molded around a subset of said plurality of projections to thereby secure said chute door to said first surface.

7. The method according to claim 4, wherein said chute door is molded into some of said apertures in said hinge to thereby secure said chute door to said hinge.

8. The method according to claim 1, wherein step d.) comprises molding said chute onto said first surface and around said chute door.

9. The method according to claim 8, wherein step d.) comprises injection molding said chute onto said first surface and around said chute door.

10. The method according to claim 8, wherein said plurality of projections includes a set of fourth projections and wherein said chute is molded around said set of fourth projections to thereby secure said chute to said first surface.

11. The method according to claim 1, wherein said substrate, said hinge, said chute door and said chute are each formed from a material comprising a thermoplastic polyolefin.

12. The method according to claim 1, further comprising providing at least one burst seam in said chute panel comprising at least one gap between said chute door and said chute.

13. The method according to claim 12, wherein said at least one burst seam has a shape selected from the group consisting of a U shape, an H shape, a Y shape, and a bow tie shape.

14. A chute panel of an airbag assembly comprising:
 a substrate having a first surface and a plurality of projections on said first surface, said plurality of projections comprising a set of first projections and a set of second projections;
 a hinge comprising a first leaf joined to a second leaf by a flexible wing, said first leaf and said second leaf each having a plurality of apertures in them, wherein said plurality of apertures in said first leaf are mated to said set of first projections and at least some of said plurality of apertures in said second leaf are mated to said set of second projections to thereby secure said hinge to said first surface;

a chute door molded onto said first surface and a portion of said hinge; and a chute molded onto said first surface and surrounding said chute door.

15. The chute panel of an airbag assembly as recited in claim 14, wherein said substrate, said hinge, said chute door and said chute are formed from a thermoplastic polyolefin material.

16. The chute panel of an airbag assembly as recited in claim 14, wherein said hinge is a unitary design and is formed as a single piece.

17. The chute panel of an airbag assembly as recited in claim 14, wherein said plurality of projections further comprises a set of third projections and said chute door is molded into some of said plurality of apertures in said second leaf of said hinge and around said set of third projections on said first surface.

18. The chute panel of an airbag assembly as recited in claim 14, wherein said plurality of projections further comprises a set of fourth projections and said chute is molded around said set of fourth projections.

19. The chute panel of an airbag assembly as recited in claim 14, further comprising at least one burst seam defined by at least one gap between said chute door and said chute.

20. The chute panel of an airbag assembly as recited in claim 18, wherein said at least one burst seam has a shape selected from the group consisting of a U shape, an H shape, a Y shape, and a bow tie shape.

\* \* \* \* \*